US007315528B2

(12) United States Patent
Leeuwen

(10) Patent No.: US 7,315,528 B2
(45) Date of Patent: Jan. 1, 2008

(54) MANAGEMENT OF FRAME BURSTING

(75) Inventor: Richard M. Leeuwen, Zoetermeer (NL)

(73) Assignee: Agere Systems Inc., Allentown, PA (US)

( * ) Notice: Subject to any disclaimer, the term of this patent is extended or adjusted under 35 U.S.C. 154(b) by 844 days.

(21) Appl. No.: 10/638,663

(22) Filed: Aug. 11, 2003

(65) Prior Publication Data

US 2005/0036448 A1    Feb. 17, 2005

(51) Int. Cl.
*H04Q 7/24* (2006.01)
(52) U.S. Cl. .................. 370/329; 370/338; 370/412
(58) Field of Classification Search ............. 370/338, 370/329, 395.2, 395.21, 412, 415–418, 447–448, 370/230, 230.1, 237
See application file for complete search history.

(56) References Cited

U.S. PATENT DOCUMENTS

| 2002/0054574 | A1  | 5/2002  | Beach et al. |
| 2003/0053469 | A1* | 3/2003  | Wentink ................... 370/412 |
| 2003/0135640 | A1* | 7/2003  | Ho et al. .................. 709/237 |
| 2003/0223365 | A1* | 12/2003 | Kowalski ................. 370/230.1 |
| 2005/0030894 | A1* | 2/2005  | Stephens .................. 370/230 |
| 2006/0072488 | A1* | 4/2006  | Meier ...................... 370/312 |

OTHER PUBLICATIONS

Choi S. et al., "IEEE 802.11E Contention-Based Channel Access (EDCF) Performance Evaluation," ICC 2003, 2003 IEEE International Conference on Communications, Anchorage, AL, May 11-15, 2003, IEEE International Conference on Communications, New York, NY, IEEE, US, vol. 2 of 5, XP008056918, pp. 1151-1156.

Siris V.A. et al., "Achieving Service Differentiation and High Utilization in IEEE 802.11," Institute of Computer Science (ICS), Forth and University of Crete, Technical Report 322, Jun. 2003, XP002301409, pp. 1-17.

Tanenbaum, "Computer Networks," 1981, Prentice/Hall International, Inc., USA, XP002381297, p. 269.

* cited by examiner

*Primary Examiner*—Nguyen T. Vo

(57) ABSTRACT

A method of data transmission employing frame bursting to improve traffic in a WLAN system. According to a representative embodiment of the invention, a variable parameter set, VPS[n], is provided to a channel access function in the process of obtaining a transmission opportunity (TXOP) for a corresponding access category, AC-n, at a wireless station of the WLAN system. The variation of one or more values in VPS[n] is based on the amount of buffered traffic and is preferably performed such that, when a TXOP is granted, AC-n has buffered an amount of traffic suitable for transmission using frame bursting in such a manner that the service and back-off overheads for AC-n are substantially reduced. Due to the overhead reduction, more channel time becomes available to traffic from other access categories and/or wireless stations. For example, bursting video traffic in accordance with the invention may significantly improve best-effort traffic. In addition, less channel time may be lost to collisions.

22 Claims, 4 Drawing Sheets

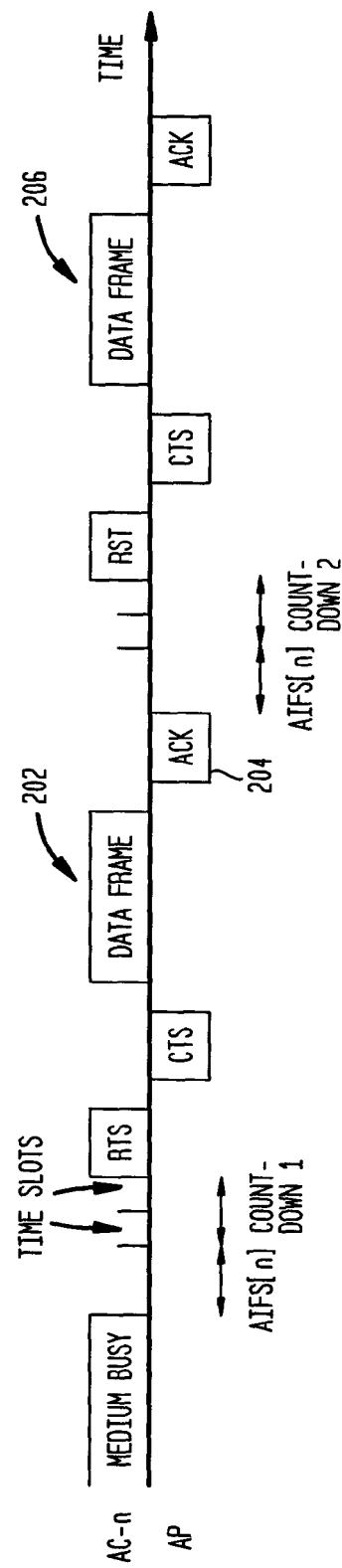
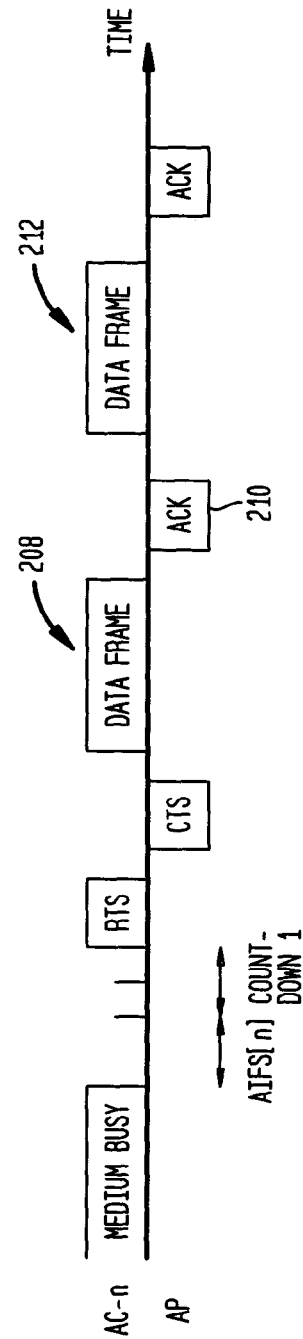

MANAGEMENT OF FRAME BURSTING

BACKGROUND OF THE INVENTION

1. Field of the Invention

The present invention relates to communication equipment and, more specifically, to equipment for wireless local area networks (WLANs).

2. Description of the Related Art

IEEE Standard 802.11 has emerged as a prevailing technology for broadband access in WLAN systems and is regarded by many as a wireless version of Ethernet. The 802.11 legacy medium access control (MAC) is based upon best-effort service, which does not support quality of service (QoS) for users or applications. However, the increasing demand for streaming voice and video transmissions, which typically have certain QoS requirements, prompted the 802.11 Working Group to begin work on an extension to the standard. The upcoming 802.11e supplement standard will define enhancements to the legacy 802.11 MAC providing a QoS support facility.

Draft standard 802.11e (version D4.0 of November, 2002), the teachings of which are incorporated herein by reference, provides two mechanisms for the support of applications with QoS requirements. The first mechanism, designated as Enhanced Distributed Coordination Function (EDCF), is based on differentiating priorities at which data traffic is to be delivered. The second mechanism allows for scheduling of transmission opportunities with the hybrid coordinator located at the access point (AP) of the WLAN.

The EDCF is based on eight priority values, designated 0 to 7, which are analogous to IEEE 802.1 d priority tags. Each data frame to be transmitted is provided with a priority value, based on which the frame is sorted into one of the following four access categories (ACs): best effort, video probe, video, and voice. Each AC contends for access to the wireless medium based on the corresponding QoS parameter set (PS) including, for example, the values of (i) CWmin and CWmax specifying the contention window and (ii) arbitration inter-frame spacing (AIFS). After winning a contention, an AC is allowed to transmit one or more frames in addition to the first frame without having to re-contend for access to the wireless medium for the transmission of the additional frames. Such transmission of multiple frames is referred to as frame bursting. Although frame bursting typically improves effective capacity of the communication channel, methods directed to efficient utilization of frame bursting by wireless stations are not sufficiently developed.

SUMMARY OF THE INVENTION

Problems in the prior art are addressed, in accordance with the principles of the present invention, by a method of data transmission employing frame bursting to improve traffic in a WLAN system. According to a representative embodiment of the invention, a variable parameter set, VPS[n], is provided to a channel access function in the process of obtaining a transmission opportunity (TXOP) for a corresponding access category, AC-n, at a wireless station of the WLAN system. The variation of one or more values in VPS[n] is based on the amount of buffered traffic and is preferably performed such that, when a TXOP is granted, AC-n has buffered an amount of traffic suitable for transmission using frame bursting in such a manner that the service and back-off overheads for AC-n are substantially reduced. Due to the overhead reduction, more channel time becomes available to traffic from other access categories and/or wireless stations. For example, bursting video traffic in accordance with the invention may significantly improve best-effort traffic. In addition, less channel time may be lost to collisions.

According to one embodiment, the present invention is a method of data transmission at a node of a contention-based WLAN system, the method comprising: (A) determining a first amount of data in a transmission queue corresponding to a first access category; and (B) obtaining a first transmission opportunity for the first access category using a first variable parameter set (VPS), wherein at least one parameter value in the first VPS is determined based on the first amount.

According to another embodiment, the present invention is an apparatus for a node in a contention-based WLAN system, the apparatus comprising:(A) a first buffer configured to queue data corresponding to a first access category; and (B) a controller adapted to control data transmission at the node, wherein the controller is configured to: determine an amount of data in the first buffer; and obtain a first transmission opportunity for the first access category using a first variable parameter set (VPS), wherein at least one parameter value in the first VPS is determined based on the amount of data in the first buffer.

According to yet another embodiment, the present invention is a contention-based WLAN system, including a plurality of nodes configured to transmit data, wherein at least one node includes an apparatus comprising: (A) a buffer configured to queue data corresponding to a first access category; and (B) a controller adapted to control data transmission at the node, wherein the controller is configured to: determine an amount of data in the buffer; and obtain a first transmission opportunity for the first access category using a variable parameter set (VPS), wherein at least one parameter value in the VPS is determined based on the amount of data.

BRIEF DESCRIPTION OF THE DRAWINGS

FIGS. 2A-B graphically illustrate frame transmission without and with frame bursting, respectively, for a STA configured in accordance with FIG. 1;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
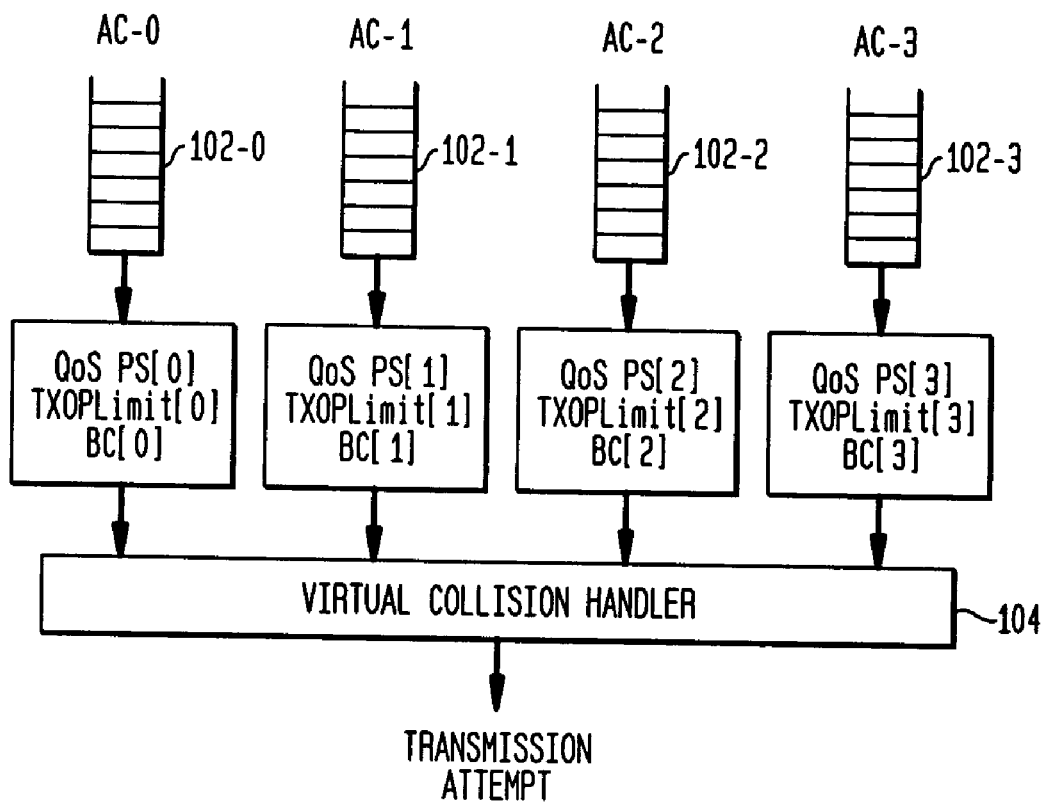
FIG. 1 shows a block diagram illustrating the 802.11e MAC for a representative station (STA) of a WLAN.

FIG. 1 shows a block diagram illustrating the 802.11e MAC for a representative station (STA) of a WLAN. Each access category at the STA, hereafter designated AC-n, where n=0, 1, 2, 3, has a separate transmission queue 102-n, in which data to be transmitted are buffered. According to draft standard 802.11 e, AC-n is configured to behave as a separate EDCF contending entity having its own QoS parameter set (PS[n]) and maintaining its own back-off counter (BC[n]). AC-n contends for channel access based on the values of AIFS[n], CWmin[n], and CWmax[n] specified in QoS PS[n]. In addition, in beacon frames, the AP announces system-wide the values of TXOPLimit[n], each defining the maximum duration of a frame burst for the corresponding AC. When more than one AC-n at the STA finish their back-off procedures at the same time, any collision between these ACs is resolved by a virtual collision handler (VCH) 104 in favor of the AC having the highest priority. For example, if the collision occurs between the video and best-effort ACs, the video AC wins the contention and is granted a transmission opportunity (TXOP).

In one embodiment, the MAC of FIG. 1 is implemented using (i) one or more buffers configured to queue data corresponding to different access categories and (ii) a controller adapted to control data transmission at the STA. More specifically, the buffer corresponds to transmission queues 102-n of FIG. 1, and the controller is configured to (a) implement a channel access function based on QoS PS[n], BC[n], and TXOPLimit[n] as indicated in FIG. 1 and (b) perform functions of VCH 104.

FIGS. 2A-B graphically illustrate frame transmission between a STA configured in accordance with FIG. 1 and the AP of a WLAN without and with frame bursting, respectively. Illustratively, transmission of two data frames from a particular queue 102-n corresponding to AC-n (FIG. 1) is shown in each figure. Referring to FIG. 2A, AC-n starts a back-off procedure after detecting that the wireless medium has been idle for an AIFS[n] interval. The value of BC[n] is set to a random number drawn from the interval of 1 to CW[n]+1, where CW[n] is a state variable for AC-n. CW[n] is typically initialized at the value of CWmin[n] but may be adjusted up to the value of CWmax[n] if a transmission fails. BC[n] is decremented in accordance with the rules of the channel access function, e.g., as specified in draft standard 802.11e. When BC[n] reaches zero, AC-n may be granted a TXOP. The first TXOP of FIG. 2A is granted to AC-n after countdown 1, which is illustratively shown as consisting of two 9-µs time slots. After an exchange of request-to-send (RTS) and clear-to-send (CTS) frames between the STA and AP, AC-n transmits a first data frame 202 and receives an acknowledgment (ACK) frame 204 confirming successful receipt of that data frame at the AP. To transmit a second data frame 206, AC-n enters a new contention for the next TXOP, which is illustratively shown in FIG. 2A as granted after the AIFS[n] and countdown 2 following ACK frame 204. Transmission of frame 206 is accompanied by a similar exchange of RTS, CTS, and ACK frames between the STA and AP.

FIG. 2B shows transmission of data frames 208 and 212, which are similar to frames 202 and 206 of FIG. 2A, when AC-n invokes frame bursting. Similar to FIG. 2A, AC-n is granted a TXOP following an AIFS[n] and countdown 1. However, in contrast to FIG. 2A, second data frame 212 is transmitted after an ACK frame 210 without a new contention and back-off procedure. As a result, the amount of time to transmit two data frames in FIG. 2B is reduced compared to that in FIG. 2A with the time savings coming mostly from the reduced service and back-off overheads, i.e., fewer service frames to transmit and no additional back-off procedures to perform. Consequently, more channel time becomes available to data traffic from other ACs of the same STA and/or from other STAs.

The inventor's own research demonstrated that, when the WLAN generates a moderate amount of traffic, an AC sending traffic of relatively high-priority, e.g., video, has a relatively high probability of winning the contention for channel access with just a single frame or a few frames in its queue. As a result, either frame bursting is not invoked at all or, when frame bursting is invoked, the overhead reduction is not sufficiently large to improve data traffic of relatively low priority, e.g., best effort. It is therefore desirable to have a method of data transmission that makes efficient use of frame bursting.

Figure 3:
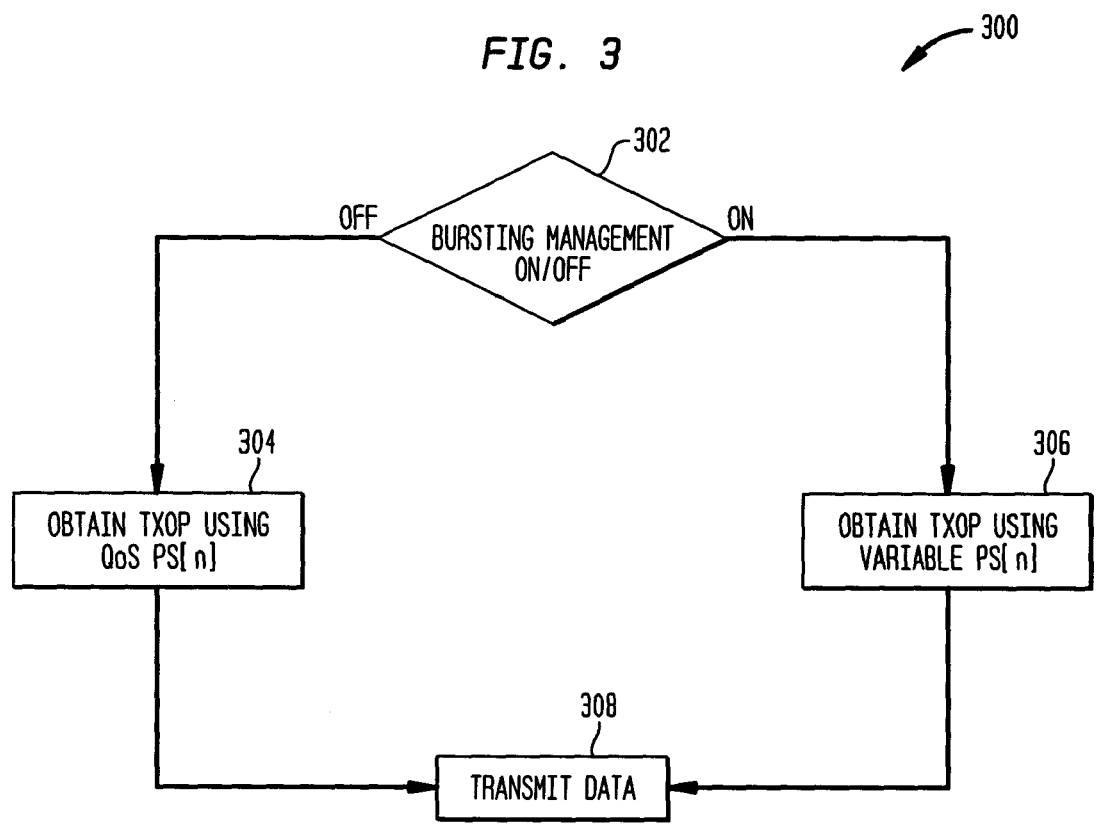
FIG. 3 shows a flowchart of a method of data transmission according to one embodiment of the present invention.

FIG. 3 shows a flowchart of a method 300 of data transmission in a WLAN system according to one embodiment of the present invention. Method 300 implements bursting management to improve data traffic and can be employed, for example, in a STA configured in accordance with FIG. 1.

Step 302 of method 300 provides, for at least one AC-n at the STA, dynamic switching between two different configurations, each of which can be used to gain channel access. The first and second configurations are used in steps 304 and 306, respectively. After obtaining a TXOP in either step 304 or 306, AC-n proceeds to step 308 to transmit data. Depending on the amount of data in queue 102-n, AC-n may transmit a single data frame, as shown in FIG. 2A, or multiple data frames, as shown in FIG. 2B, taking up to TXOPLimit[n] of channel time.

In step 304, AC-n uses the first configuration, in which a regular parameter set, QoS PS[n], is used to obtain a TXOP, for example, as described above in reference to FIG. 2. It should be noted that parameter values in QoS PS [n] do not depend on the amount of traffic buffered for transmission and, therefore, for the purpose of this specification, QoS PS[n] can be referred to as a fixed parameter set.

In contrast, in step 306, AC-n uses the second configuration, in which one or more parameter values used to obtain a TXOP (e.g., CWmin[n], CWmax[n], and/or AIFS[n]) are allowed to vary based on the amount of data buffered by AC-n in queue 102-n. A parameter set including at least one variable parameter is hereafter referred to as a variable parameter set, VPS[n]. Although VPS[n] is analogous to the regular QoS PS[n], in contrast to the latter, the former may supply a different set of values to the channel access function each time said function is invoked. One purpose of using VPS[n] instead of QoS PS[n] is to be able to adjust the probable wait time until a TXOP is granted to AC-n. This time adjustment is preferably carried out in such a manner that, AC-n can utilize frame bursting relatively efficiently. For example, when the amount of buffered data is relatively low, VPS[n] is modified to effectively delay channel access for AC-n. This delay is used to increase the amount of buffered data to a selected level, at which the service and back-off overheads can be significantly reduced through the use of frame bursting. On the other hand, when the amount of buffered data has reached the selected level, VPS[N] may be readjusted to facilitate faster channel access. As already indicated above, efficient utilization of frame bursting for traffic of relatively high priority, e.g., video, may significantly improve traffic of relatively low priority, e.g., best effort. In addition, because the more aggressive channel access parameter values corresponding to one or more high-priority ACs are used less frequently, the processing of step 306 lowers the overall collision probability. This may further improve data traffic, due to the fact that less channel time is lost to collisions.

In one implementation, the choice of whether the processing of method 300 proceeds via step 304 or step 306 may be based on an "urgency flag" supplied with certain frames. For example, certain higher layer acknowledgement schemes in standard 802.11 require a prompt response from the STA before it can continue to stream regular traffic.

Consequently, when a frame in the queue is flagged urgent, the processing of method 300 is directed via step 304, while, when there are no flagged frames, the processing is directed via step 306.

Figure 4:
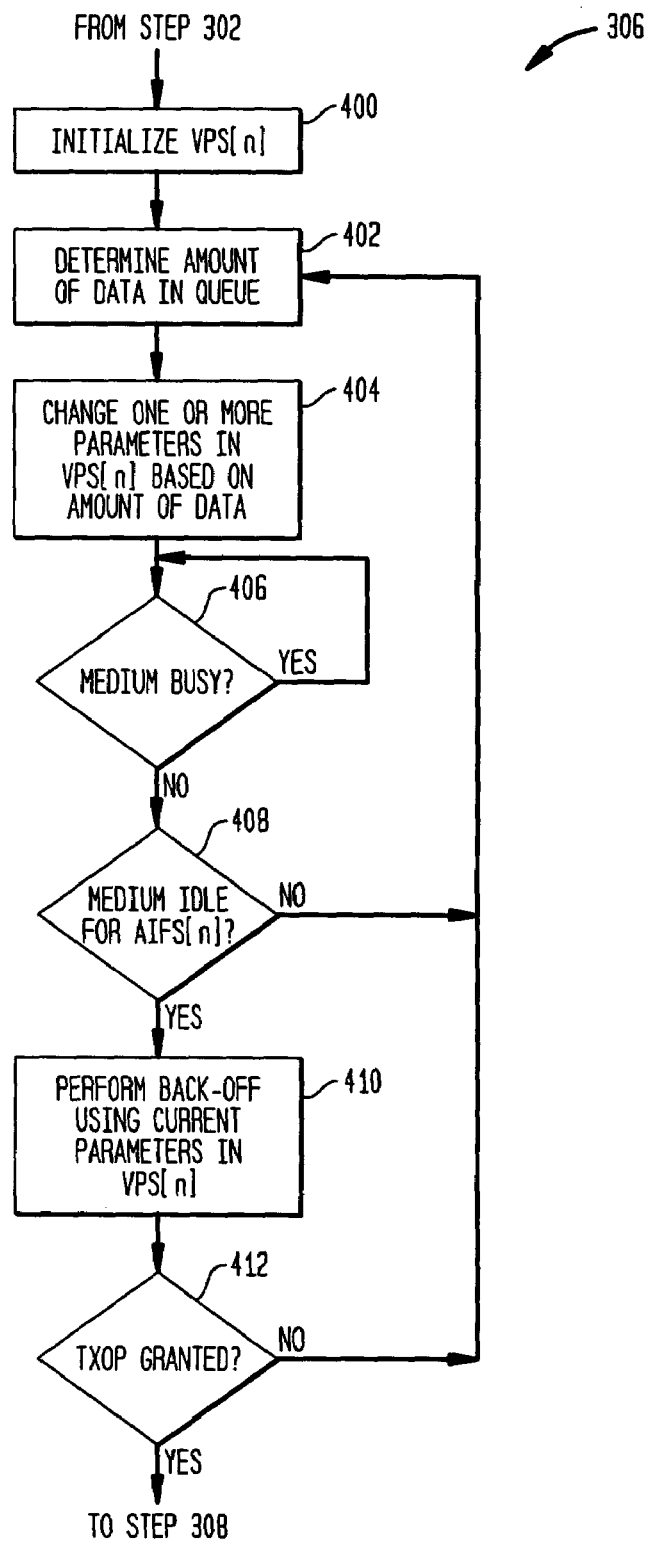
FIG. 4 shows a flowchart of a step of obtaining a transmission opportunity (TXOP) in the method of FIG. 3 according to one embodiment of the present invention.

FIG. 4 shows a flowchart of step 306 according to one embodiment of the present invention. Step 306 comprises steps 400-412, a description of which follows.

In step 400, VPS[n] is initialized to have the same parameter values as QoS PS[n].

In step 402, AC-n determines the amount of data buffered in queue 102-n. In one implementation, the amount of data can be measured in the units of data frames. Alternatively, the amount of data can be measured in the units of time required for data transmission at the currently advised data rate. One possible unit of time that can be used for the measurement of step 402 is the value of TXOPLimit[n] with the amount of data indicated as the corresponding percentage of that value.

In step 404, based on the measurement of step 402, one or more parameter values in VPS[n] are modified to change the probable wait time until a TXOP is granted to AC-n. As already indicated above, the adjustable parameters of VPS[n] may include but are not limited to CWmin[n], CWmax[n], and AIFS[n]. In general, the parameter adjustment is performed such that, at the moment of transmission, a relatively large amount of data has been buffered to obtain a substantial overhead reduction through the use of frame bursting.

In one implementation, the processing of step 404 is as follows. When the amount of data in queue 102-n is below a selected threshold value, VPS[n] is set to be equal QoS PS[j], where j<n, i.e., the QoS parameter set of AC-j which has lower priority than AC-n. For example, if AC-n is video, AC-j may be best effort. However, when the amount of data is above the threshold value, VPS[n] is reverted back to QoS PS[n]. The threshold value may be set, for example, at N data frames or 50% of TXOPLimit[n]. In alternative implementations, the processing of step 404 may be based on two or more threshold values or a mathematical relationship between the amount of data and each adjustable parameter value in VPS[n]. One such mathematical relationship is, for example, a linear function. In addition, the number of adjustable parameters in VPS[n] may be varied as necessary.

In step 406, the STA monitors the state (i.e., busy or idle) of the wireless medium and provides this information to its ACs. If it is determined that the medium has become idle, the processing continues on to step 408 where AC-n has to wait for at least an AIFS[n] interval before it can perform a back-off procedure. In one implementation of step 408, the value of AIFS[n] is an adjustable parameter specified in VPS[n]. If the medium has become busy sooner than an AIFS[n] interval has elapsed, the processing is returned to step 402. However, if the medium has remained idle for an AIFS[n] interval, the processing is directed to step 410.

In step 410, a back-off procedure preferably analogous to that described in draft standard 802.11e is performed. However, one difference between the back-off procedure of step 410 and that of standard 802.11e is that the former uses parameter values from VPS[n] while the latter uses QoS PS[n]. In step 412, it is determined whether or not AC-n has won the contention for a TXOP. If a TXOP is granted to AC-n, the processing is then directed to step 308 (FIG. 3). However, if a TXOP has been granted to a different AC or a different STA and/or the medium has become busy, then the processing is returned to step 402.

The following two examples illustrate the operation of a WLAN system having one or more STAs configured to use method 300. Suppose that the WLAN system has one STA transmitting a video stream and several additional STAs transmitting best-effort traffic with the total amount of traffic in the system being moderate. In this WLAN configuration, if the access function uses regular parameter values from QoS PS[n], the video STA has a relatively high probability of winning the contention for channel access. However, in accordance with method 300, the use of VPS[n] instead of QoS PS[n] reduces the effective priority of the video STA when a relatively low amount of video traffic is buffered. As a result, channel access for the video STA is delayed and, during the delay, the video queue can buffer additional data, which permits efficient use of frame bursting. As already indicated above, the ensuing reduced service and back-off overheads may improve channel availability to best-effort traffic.

Suppose now that the WLAN system has multiple video streams, for the purpose of this particular example, coming from different STAs. In this WLAN configuration, a first STA, which has just transmitted a frame burst, is likely to have a relatively small amount of buffered data when it begins the next contention for channel access. Then, in accordance with method 300, due to the use of VPS[n], the first STA has a reduced effective priority compared to, for example, the effective priority of a second STA, which has more data in its queue due to a longer period of time since the last transmission. As such, the second STA has a higher probability of winning the contention for channel access than the first STA. As a result, different video STAs will transmit data in a relatively orderly fashion, effectively taking turns for transmission. As already indicated above, this may reduce the number of collisions and therefore improve the effective channel capacity.

Advantageously, according to the invention, frame bursting is managed locally and, as such, does not require an "over the air" protocol. As a result, there are no substantial compatibility issues in the situation when some STAs in a WLAN system are configured in accordance with the invention while other STAs are configured in accordance with the teachings of the prior art. To maximize traffic improvements, however, it is preferred that all STAs in the WLAN system including the AP are configured in accordance with the invention.

While this invention has been described with reference to illustrative embodiments, this description is not intended to be construed in a limiting sense. Although the invention is described in reference to IEEE standard 802.11, it can similarly be practiced in other contention-based WLAN systems. A wireless station, in which the invention can be practiced, may be a client terminal or an access point in a WLAN system. A particular station may be configured to use two or more variable parameter sets, each corresponding to a different access category at that station. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as floppy diskettes, ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

What is claimed is:

1. Apparatus for a node in a contention-based WLAN system, the apparatus comprising:
   (A) a first buffer configured to queue data corresponding to a first access category; and
   (B) a controller adapted to control data transmission at the node, wherein the controller is configured to:
      determine an amount of data in the first buffer; and
      obtain a first transmission opportunity for the first access category using a first variable parameter set (VPS), wherein the controller determines at least one parameter value in the first VPS based on the amount of data in the first buffer, wherein the node is a client terminal of the WLAN system, wherein the controller is adapted to:
         initialize the first VPS to have parameter values from a fixed parameter set corresponding to the first access category;
         compare the amount of data with a threshold value; and
         change at least one parameter value in the first VPS based on the comparison.

2. The apparatus of claim 1, wherein the contention-based WLAN system conforms to an IEEE 802.11 standard and supports a quality of service (QoS) facility.

3. The apparatus of claim 1, wherein the node is adapted to transmit data using frame bursting.

4. The apparatus of claim 3, wherein the node is adapted to manage said frame bursting without an over the air protocol involving an access point of the WLAN system.

5. The apparatus of claim 1, wherein the controller is configured to obtain a second transmission opportunity for the first access category using a fixed parameter set corresponding to said access category.

6. The apparatus of claim 1, further comprising a second buffer configured to queue data corresponding to a second access category, wherein the controller is configured to:
   determine an amount of data in the second buffer; and
   obtain a transmission opportunity for the second access category using a second VPS, wherein at least one parameter value in the second VPS is determined based on the amount of data in the second buffer.

7. A contention-based WLAN system, including a plurality of nodes configured to transmit data, wherein at least one node includes an apparatus comprising:
   (A) a buffer configured to queue data corresponding to a first access category; and
   (B) a controller adapted to control data transmission at the node, wherein the controller is configured to:
      determine an amount of data in the buffer; and
      obtain a first transmission opportunity for the first access category using a variable parameter set (VPS), wherein the controller determines at least one parameter value in the VPS based on the amount of data, wherein said at least one node is a client terminal of the WLAN system, wherein the controller is adapted to:
         initialize the VPS to have parameter values from a fixed parameter set corresponding to the first access category;
         compare the amount of data with a threshold value; and
         change at least one parameter value in the VPS based on the comparison.

8. The system of claim 7, wherein at least two nodes of said WLAN system concurrently use parameter sets that differ from one another in at least one parameter value.

9. The system of claim 7, wherein said at least one node is adapted to:
   transmit data using frame bursting; and
   manage said frame bursting without an over the air protocol involving an access point of the WLAN system.

10. A method of data transmission at a node of a contention-based WLAN system, the method comprising:
    (A) determining a first amount of data in a transmission queue corresponding to a first access category; and
    (B) obtaining a first transmission opportunity for the first access category using a first variable parameter set (VPS), wherein at least one parameter value in the first VPS is determined based on the first amount, wherein step (B) comprises:
       (B1) initializing the first VPS to have parameter values from a fixed parameter set corresponding to the first access category;
       (B2) comparing the first amount with a threshold value; and
       (B3) changing at least one parameter value in the first VPS based on the comparison.

11. The method of claim 10, wherein the node is a client terminal of the WLAN system.

12. The method of claim 11, wherein the contention-based WLAN system conforms to an IEEE 802.11 standard and supports a quality of service (QoS) facility.

13. The method of claim 11, further comprising transmitting data from the transmission queue using frame bursting.

14. The method of claim 13, wherein said frame bursting is managed at said node without an over the air protocol involving an access point of the WLAN system.

15. The method of claim 11, further comprising:
    (C) obtaining a second transmission opportunity for the first access category using a fixed parameter set corresponding to said access category.

16. The method of claim 15, further comprising selecting between the processing of step (B) and step (C) based on a presence of a flagged data frame in the transmission queue.

17. The method of claim 11, wherein step (B) comprises:
    determining whether a transmission medium is busy or idle; and when the transmission medium is idle, waiting for an arbitration inter-frame spacing (AIFS) interval.

18. The method of claim 17, wherein length of the AIFS interval is a variable parameter from the first VPS.

19. The method of claim 17, wherein step (B) further comprises performing a back-off procedure using parameter values from the first VPS.

20. The method of claim 11, further comprising:
determining a second amount of data in a transmission queue corresponding to a second access category; and
obtaining a transmission opportunity for the second access category using a second VPS, wherein at least one parameter value in the second VPS is determined based on the second amount.

21. The method of claim 10, wherein step (B3) comprises:
when the first amount is below the threshold value, setting the first VPS to have one or more parameter values from a fixed parameter set corresponding to a second access category; and
when the first amount is above the threshold value, setting the first VPS to have parameter values from the fixed parameter set corresponding to the first access category.

22. The method of claim 21, wherein the second access category has lower priority than the first access category.

* * * * *